United States Patent [19]
Wartluft et al.

[11] Patent Number: 5,853,272
[45] Date of Patent: Dec. 29, 1998

[54] PLASTIC PIPE END FORMING TOOL

[75] Inventors: Donald W. Wartluft, Broken Arrow; David E. Bentley, Wagoner, both of Okla.

[73] Assignee: Continental Industries, Inc., Tulsa, Okla.

[21] Appl. No.: 857,692

[22] Filed: May 16, 1997

[51] Int. Cl.⁶ ..................................................... B23B 51/00
[52] U.S. Cl. .............................. 408/199; 7/157; 408/211; 408/239 R; 425/392
[58] Field of Search .................................. 7/157; 408/199, 408/211, 227, 239 R; 72/75, 80, 112, 370.1; 425/392, 403

[56] References Cited

U.S. PATENT DOCUMENTS

| | | |
|---|---|---|
| 1,778,181 | 10/1930 | Brinkman ..................................... 72/75 |
| 2,595,319 | 5/1952 | Woldman et al. ........................... 72/80 |
| 2,838,773 | 6/1958 | Muse . |
| 3,242,526 | 3/1966 | Wilton et al. . |
| 3,457,750 | 7/1969 | Orain ........................................ 72/75 |
| 3,595,107 | 7/1971 | Dackow . |
| 3,754,832 | 8/1973 | Stickler . |
| 3,762,831 | 10/1973 | Nickolson . |
| 3,976,388 | 8/1976 | Webb . |
| 4,175,895 | 11/1979 | Burroughs . |
| 4,229,129 | 10/1980 | Schaenzer . |
| 4,406,607 | 9/1983 | Wildmoser ............................... 425/392 |
| 4,468,829 | 9/1984 | Christensen . |
| 4,586,408 | 5/1986 | Goldner . |
| 4,678,380 | 7/1987 | Zahuranec et al. ..................... 408/211 |
| 4,997,320 | 3/1991 | Hwang . |
| 5,020,401 | 6/1991 | Jiles . |
| 5,058,327 | 10/1991 | Buchanan . |
| 5,076,122 | 12/1991 | Katzenburger et al. . |
| 5,180,260 | 1/1993 | Phillips, Sr. . |
| 5,354,155 | 10/1994 | Adams . |

FOREIGN PATENT DOCUMENTS 258821   10/1989   Japan ....................................... 72/124

Primary Examiner—Daniel W. Howell
Assistant Examiner—Adesh Bhargava
Attorney, Agent, or Firm—Head, Johnson & Kachigian

[57] ABSTRACT

A plastic pipe end forming tool to form both inside and outside bevels on a pipe end. An elongated body has a cavity constituting a cylindrical channel. A pair of opposed protrusions extend into the cylindrical channel to form a V-shaped space to receive the pipe end therein and to allow rotation of the pipe in the cylindrical channel and thereby form bevels on the pipe end.

11 Claims, 2 Drawing Sheets

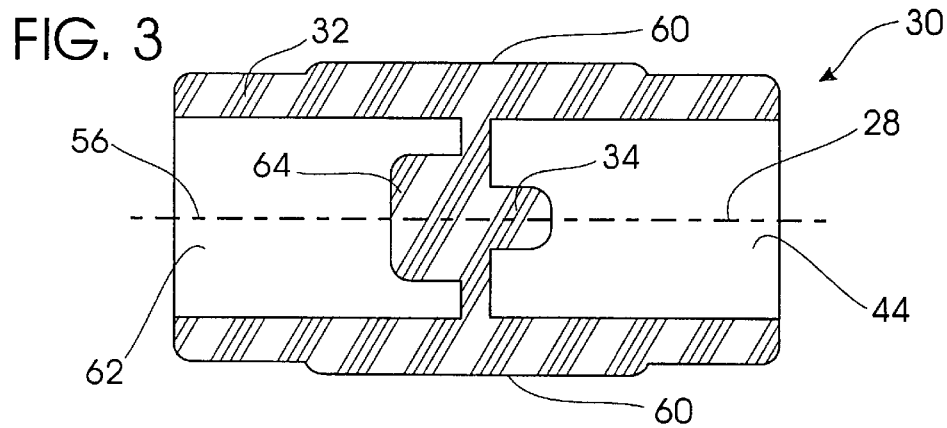
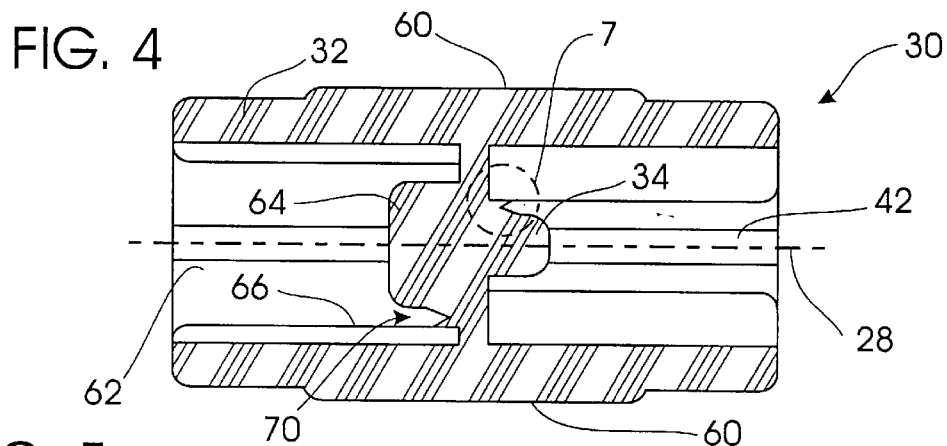
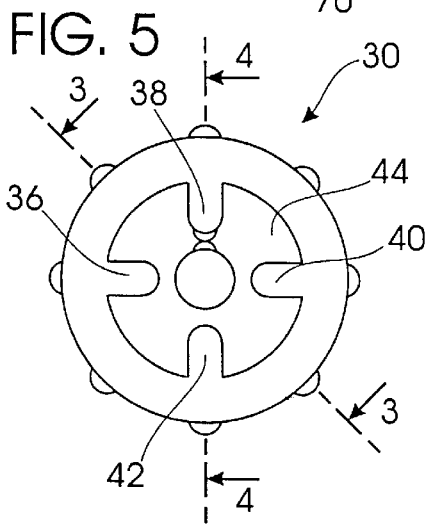
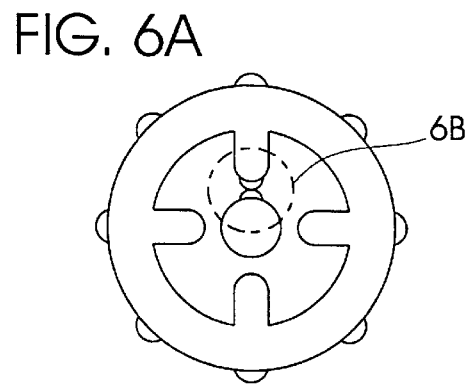
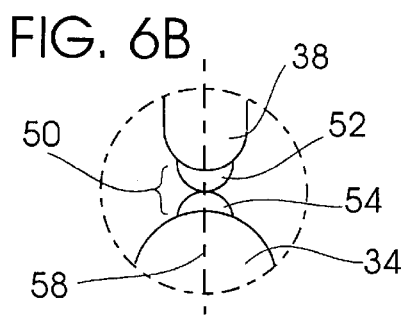
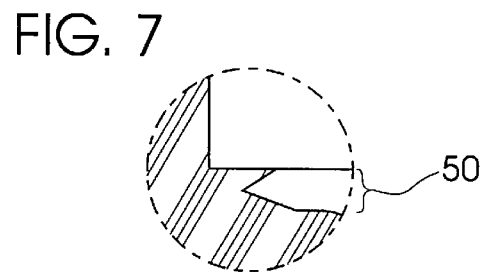

PLASTIC PIPE END FORMING TOOL

BACKGROUND OF THE INVENTION

1. Field of the Invention

The present invention is directed to a forming tool for plastic pipe that will form an inside and outside bevel on a plastic pipe end. In particular, the present invention is directed to a plastic pipe end forming tool that will form an inside and outside bevel without creating any shavings or chips.

2. Prior Art

Plastic piping and plastic piping systems have become important in many industries. Among these industries are oil, gas and water transmission, sewer and drain transmission, fire sprinkler systems, and double containment piping for handling of toxic materials. The acceptance of plastic piping systems has been due to its many desirable features such as corrosion resistance, chemical resistance, low thermal conductivity, flexibility, light weight nature, and variety of joining methods. These joining methods may include various fittings such as stab on couplings. For example, one such coupling is shown in Assignee's U.S. Pat. No. 5,524,940.

Thermoplastic piping is generally produced by extrusion in long lengths which is then cut, often times at the field installation location, to the desired length. The thermoplastic pipe may be composed of a variety of materials, such as polyvinyl chloride (PVC), polyethylene (PE), or acrylonitrile-butadiene-styrene (ABS). It is known that the thermoplastic piping is slightly malleable.

At the field installation level, when the thermoplastic pipe is cut to the desired length, the end is typically cut off perpendicular to the axis of the pipe. The face of the pipe end is therefor flat. Before the pipe end is inserted into a fitting, it has been found to be desirable to provide a beveled edge to the pipe end. In some applications, it is desirable to have a bevel on both the outside edge (to the outside diameter of the pipe) and on the inside edge (to the inside diameter of the pipe). This will allow for easier installation into socket depths and will also allow the pipe to pass over O-rings or other seals without unseating the seal.

In the past, chamfering or beveling of pipe ends has been performed by shaving with a blade. One such tool is similar to a pencil sharpener having an angled blade oriented in a holder. Examples are also seen in Muse (U.S. Pat. No. 2,838,773) and Dackow (U.S. Pat. No. 3,595,107). While these tools adequately put a bevel on the edge or on the edges, they also leave shavings or chips in the process. While the shavings from the OD would normally fall away, it is possible for the ID shavings to be deposited inside of the pipe, which is not desirable.

There is, therefore, a need to provide a forming tool for plastic pipe that will form a bevel on both the inside and outside edge without producing any shavings or chips.

Accordingly, it is a principal object and purpose of the present invention to provide a forming tool that will simultaneously form a bevel on the outside and inside edges of a pipe end.

It is a further object and purpose of the present invention to provide a forming tool that will form both an inside and outside bevel on a pipe end without producing any shavings or chips.

It is a further object and purpose of the present invention to provide a forming tool that may be manually operated by rotation in either direction.

It is a further object and purpose of the present invention to provide a double ended plastic pipe forming tool that will form inside and outside beveled edges that will accommodate more than one pipe diameter.

SUMMARY OF THE INVENTION

The present invention is directed to a plastic pipe end forming tool which will simultaneously form both an inside and outside bevel on the plastic pipe end. The forming tool includes an elongated body which is substantially cylindrical. The elongated body includes a first cavity. Within the cavity is a cylindrical central hub which is axially aligned with the cylindrical body. A plurality of guiding ribs are parallel to the axis of the cylindrical body. The central hub and the guiding ribs combine together to form a first cylindrical channel in the first cavity. The outside surface of the pipe will engage and be guided by the ribs. Likewise, the inside surface of the pipe will engage and be guided by the central hub. A pair of opposed protrusions extend into the cylindrical channel. One protrusion extends inward toward the axis from a guiding rib while the other protrusion extends outward radially from the central hub. The opposed protrusions form a cross-sectional V-shape. The protrusions are rounded or spherical knobs. Each spherical knob has a center point which, if connected, would form a line coinciding with the radius of the cavity.

In order to form a beveled edge on both the outside and inside of the plastic pipe end, a pipe having a flat face will be inserted into the first cavity. The pipe will be manually inserted and moved axially into the first cavity. The pipe end will be forced axially into the cylindrical channel until it engages with the pair of opposed protrusions or spheres which form a cross-sectional V-shaped space. The space between the spheres is less than the pipe thickness. The pipe will be held and rotated while at the same time maintaining the axial force on the pipe. As the pipe is rotated, the pipe end will pass the spherical knobs of the opposed protrusions thereby forming inside and outside bevels on the pipe ends. In the present embodiment, the tool is double sided and has an additional cavity and cylindrical channel to receive a pipe end of a different diameter.

BRIEF DESCRIPTION OF THE DRAWINGS

FIG. 3 is a sectional view of a plastic pipe end forming tool constructed in accordance with the present invention;

FIG. 4 is a sectional view of the plastic pipe end forming tool rotated from the sectional view shown in FIG. 3;

FIG. 5 is an end view of the plastic pipe end forming tool shown in FIGS. 3 and 4;

FIG. 6A is an end view and FIG. 6B is an exploded, partial view of a plastic pipe end forming tool as shown in FIGS. 3, 4 and 5; and FIG. 7 is an enlarged view of the portion shown in FIG. 4.

DETAILED DESCRIPTION OF THE PREFERRED EMBODIMENTS

Figure 1:
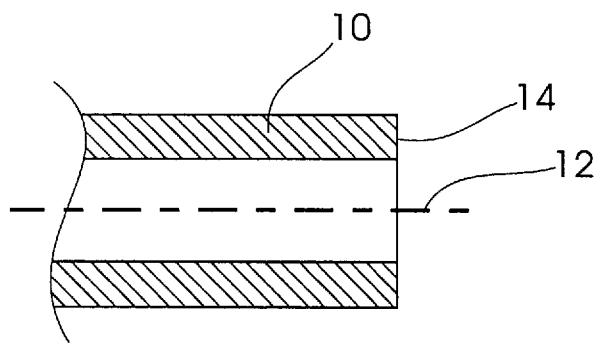
FIG. 1 is a partial view of a plastic pipe end shown in section through a diameter of the pipe.

Referring to the drawings in detail, FIG. 1 shows a cross-sectional view of a portion of plastic piping 10 which has been cut through a diameter for clarity. In the present embodiment, polyethylene pipe is shown although the invention will work equally well with other plastics. The pipe 10 has an axis illustrated by the dashed line 12. The plastic pipe, during installation, will be cut off to the desired length perpendicular to the axis 12 to form a flat face 14. It is known that polyethylene is an insulator and is subject to collection of static electricity which promotes a tendency to attract chips or shavings.

In some usage applications, it has been found that it is extremely desirable to add both an inside and outside beveled edge to the pipe end 14. For example, Assignee's stab-type coupler shown in U.S. Pat. No. 5,524,940 has both outside and inside seals that engage the pipe walls. It has been found that beveled pipe ends will more easily engage the coupler.

Figure 2:
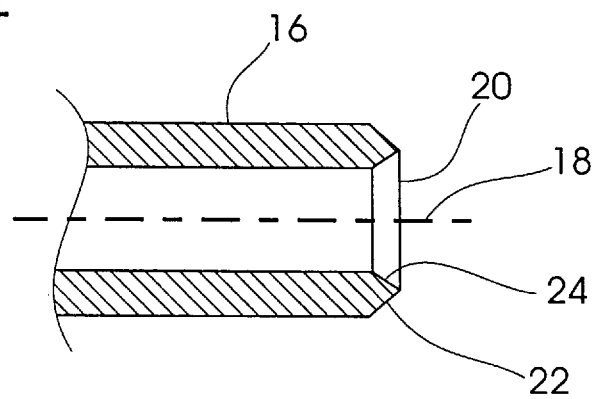
FIG. 2 is a partial view of a plastic pipe end after application of the present invention.

FIG. 2 illustrates a cross-section of a plastic pipe 16 having an axis illustrated by dashed line 18. The face 20 of the pipe 16 has both an outside bevel 22 extending between the pipe end 20 and outside pipe surface and an inside bevel 24 extending between the pipe end 20 and inside pipe surface. FIG. 2, thus, illustrates a pipe end after usage of the present invention.

FIGS. 3, 4 and 5 illustrate a plastic pipe end forming tool 30 which is constructed in accordance with the present invention. The tool 30 includes an elongated body 32 which, in the present embodiment, is substantially cylindrical. The elongated body 32 includes a first cavity 44 having an axis illustrated by dashed line 28.

FIG. 5 is a top view of the forming tool 30, shown in FIGS. 3 and 4. The forming tool 30 includes a cylindrical central hub 34 in the cavity 44. The tool 30 also includes a plurality of guiding ribs 36, 38, 40 and 42 which extend from the body into the first cavity 44. The guiding ribs are parallel to the axis 28. The central hub 34 and guiding ribs combine together to form a first cylindrical channel 50 in the first cavity 44. The outside surface of the pipe will engage and be guided by the ribs. The inside surface of the pipe will engage and be guided by the central hub.

As best seen in FIGS. 6A and 6B, within the first cylindrical channel 50, a pair of opposed protrusions 52 and 54 extend into the channel 50. In the present embodiment, protrusion 52 extends inward toward the axis 28 from guiding rib 38 and protrusion 54 extends outward radially from central hub 34. The opposed protrusions 52 and 54 form, in cross-section, a V-shape as best seen in FIG. 7. It has been found that the forming operation works best when the protrusions are fabricated from material that is at least a grade harder than the pipe material.

As seen in FIG. 6B, the protrusions are rounded or spherical knobs. Each spherical knob has a center point which, if connected, would form a line 58 which coincides with the cavity radius.

The pipe end forming tool 30 also includes a plurality of external grips 60 extending radially from the body which make it easier for the operator to grip the body of the forming tool.

The body 32 of the tool 30 may also be employed for an optional, additional purpose. The depth of the first cavity 42 may also be used to indicate the length of plastic pipe which is desirable for a stab-on coupling. In this case, once the pipe 10 has been inserted into the tool axially, the operator will mark the outside diameter of the pipe at the open end of the cavity 42. Thereafter, once the beveling operation has been performed, the operator will insert the pipe into the coupling up to the mark.

As seen in the present embodiment, the tool 30 is a double sided tool which will accommodate two different pipes of two different diameters.

The tool 30 includes a second cavity 62 having an axis 56 opposed to and in coaxial alignment with the first cavity 44 and first axis 28. A second cylindrical central hub 64 is axially aligned with the axis of the second cavity 62. Additionally, a plurality of guiding ribs 66 cooperate with the central hub 64 to form a second cylindrical channel 70. The outside surface of the pipe will be guided by and engage the guiding ribs. The inside surface of the pipe will be guided by and engage the second central hub.

A pair of opposed protrusions extend into the second cylindrical channel 70. One protrusion extends inward toward the axis 56 from guiding rib 66 while the other protrusion extends outward radially from the central hub.

In order to form a beveled edge on both the outside and inside of the plastic pipe end, a pipe, such as pipe 10 having a flat face, will be inserted into the first cavity 44 of the forming tool 30. The outside surface of the pipe 10 will engage the guiding ribs 36, 38, 40 and 42 while the inside surface of the pipe will engage the central hub 34.

The pipe 10 and its pipe end will be manually inserted and moved axially into the first cavity 44. The pipe end 14 will be forced axially into the cylindrical channel until it engages the pair of opposed protrusions or spheres 52 and 54 which form a cross-sectional V-shaped space, as best seen in FIG. 7.

The polyethylene pipe is slightly malleable. The space between the spheres is less than the pipe thickness. Thereafter, the pipe 10 will be held and rotated by the operator while at the same time maintaining the axial force on the pipe 10. As the pipe is rotated, the pipe end will pass the spherical knobs of the opposed protrusions, thereby forming the inside and outside bevels on the pipe ends. Displacement or reshaping of the pipe end is, thus, accomplished. The pipe may be rotated either clockwise or counterclockwise with equal results. No shavings or chips are produced in the process.

The tool may be used for a single size pipe diameter or the double-sided tool will accommodate pipes of two different diameters.

Whereas, the present invention has been described in relation to the drawings attached hereto, it should be understood that other and further modifications, apart from those shown or suggested herein, may be made within the spirit and scope of this invention.

What is claimed is:

1. A plastic pipe end forming tool which comprises:
   an elongated body having a cavity constituting a cylindrical channel; and
   a pair of opposed stationary protrusions extending into said channel to form a V-shaped space to receive said pipe end and to allow rotation of said pipe in said channel and thereby form inside and outside bevels on said pipe end, without removing material from said pipe end.

2. A plastic pipe end forming tool as set forth in claim 1 wherein said elongated body includes a cylindrical central hub and a plurality of guiding ribs to form said cylindrical channel.

3. A plastic pipe end forming tool as set forth in claim 1 wherein said body has external grips.

4. A plastic pipe end forming tool which comprises:
   an elongated body having a cavity constituting a cylindrical channel; and
   a pair of opposed spherical knobs in said cavity to form a space to receive said pipe end and to allow rotation of said pipe in said channel and thereby form inside and outside bevels on said pipe end, without creating chips or shavings from the said pipe end.

5. A plastic pipe end forming tool as set forth in claim 4 wherein said spherical knobs each have a center point forming a line aligned with a radius of said cylindrical channel.

6. A plastic pipe end forming tool as set forth in claim 5 wherein said elongated body includes a cylindrical central hub and a plurality of guiding ribs.

7. A plastic pipe end forming tool as set forth in claim 5 wherein said body has external grips.

8. A plastic pipe end forming tool which comprises:
an elongated body having a pair of opposed cavities to constitute a pair of coaxial cylindrical channels; and
a pair of opposed, stationery protrusions in each said cylindrical channel that form a pair of V-shaped spaces to receive said pipe end therein and to allow rotation of said pipe and thereby form inside and outside bevels on said pipe end.

9. A plastic pipe end forming tool as set forth in claim 8 wherein said cylindrical channels are of different diameters to accommodate a plurality of pipe diameters.

10. A method to form a plastic pipe end, which method comprises:
inserting a pipe having an end face perpendicular to its axis into a tool having a cavity in an elongated body forming a cylindrical channel;
manually forcing said pipe end axially into said channel to engage a pair of opposed stationary protrusions extending into said channel to form a V-shaped space; and
rotating said pipe while maintaining said axial force to form inside and outside bevels on said pipe end.

11. A method to form a plastic pipe end as set forth in claim 10 wherein said rotating of said pipe may be clockwise or counterclockwise.

* * * * *